Mar. 27, 1923. 1,449,703
F. N. SPRAGUE
ADJUSTABLE AIR AND LIQUID CUSHIONING SHOCK ABSORBING MECHANISM FOR
AUTOMOBILES AND OTHER VEHICLES
Filed Feb. 24, 1922
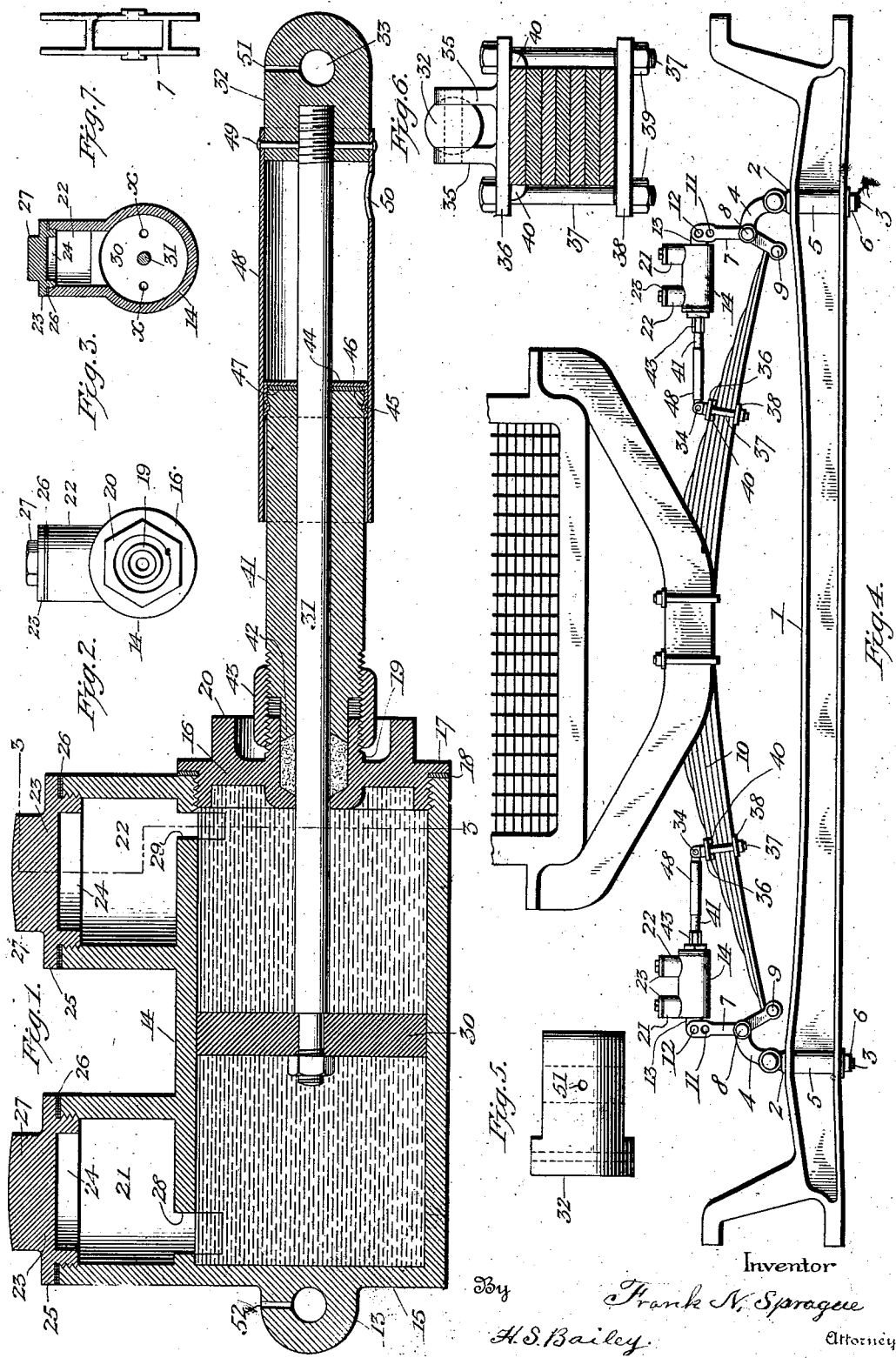
Inventor
Frank N. Sprague
By
H. S. Bailey. Attorney Patented Mar. 27, 1923.

1,449,703

UNITED STATES PATENT OFFICE.

FRANK N. SPRAGUE, OF HOLYOKE, COLORADO.

ADJUSTABLE AIR AND LIQUID CUSHIONING SHOCK-ABSORBING MECHANISM FOR AUTOMOBILES AND OTHER VEHICLES.

Application filed February 24, 1922. Serial No. 538,824.

*To all whom it may concern:*

Be it known that I, FRANK N. SPRAGUE, a citizen of the United States of America, residing at Holyoke, county of Phillips, and State of Colorado, have invented a new and useful Adjustable Air and Liquid Cushioning Shock-Absorbing Mechanism for Automobiles and Other Vehicles, of which the following is a specification.

My invention relates to improvements in adjustable air and liquid cushioning shock absorbing mechanism for automobiles and other vehicles.

The object of the invention is to provide a shock absorber, which is adapted to gradually cushion the compression and rebound of the side and end springs of automobiles and other vehicles, as well as the lateral thrust of the vehicle body.

Further, to provide a shock absorber for front and rear springs, comprising a specially constructed air and liquid cylinder, and an apertured piston therein having a rod, said cylinder being pivotally attached to the upper end of a spring supporting shackle which is pivotally secured intermediate of its length to a bracket mounted on the axle, the free end of the piston rod being pivotally secured to the spring, said cylinders being arranged in cooperating pairs, whereby, under the compression and rebound of the springs, the pistons are reciprocated in the cylinders against the retarding action of a body of liquid in said cylinders, which liquid also serves to compress a body of air in each of said cylinders, thereby gradually cushioning and finally absorbing the shock occasioned by the said compression and rebound of the springs.

Further, to provide improved means for housing the part of the piston rod outside the cylinder, thereby to prevent grit and dust from coming in contact with the said piston rod and entering the cylinder.

These objects are accomplished by the mechanism illustrated in the accompanying drawings, in which:

Figure 1 is a longitudinal, sectional view through the improved cylinder, showing means for supporting the piston rod and also means for protecting the same from contact with dust and grit.

Fig. 2 is an end view of the cylinder, on a reduced scale.

Fig. 3 is a vertical sectional view of the same on the line 3—3 of Figure 1.

Fig. 4 is a front view showing particularly the front axle and front spring of an automobile of a common type, and the manner of securing a pair of cooperating shock absorbing cylinders to the same spring and axle.

Fig. 5 is a plan view of a pivot bolt-receiving block which is secured to the free end of the piston rod.

Fig. 6 is a sectional view through the spring, showing the improved clip, which is secured to the spring, and to which the free end of the piston rod is pivotally secured. And Fig. 7 is a front view of one of the shackles.

Referring to the accompanying drawings:

The numeral 1 indicates the front axle of an automobile. This axle is provided near its ends with brackets 2, comprising vertical stems or bolts 3 and inwardly turned hanger members 4, the stems being passed through enlargements 5 of the axle and secured by nuts 6 which are screwed upon the lower ends of the stems and against the under side of the axle.

Upon the hangers 4 are pivotally mounted shackles 7, each of which comprises connected parallel arms between which the end of the hanger 4 extends, a bolt 8 being passed through the shackle intermediate of its length, and through the end of the hanger, thus pivotally securing the shackle to the hanger.

The part of the shackle above the pivot bolt 8 is vertically disposed and is forked at its extremity, while the part of the shackle below the pivot hole inclines inward at an angle of about thirty degrees and is forked at its extremity, and bolts 9 are passed through the lower forked ends of the shackles, upon which the eyed ends of the spring 10 are mounted in the usual manner. The upper forked end of each shackle is provided with two or more alined holes 11, and through one of the pairs of holes 11 of each shackle is passed a pin or bolt 12, which also passes through an apertured lug 13 which is formed on the closed end of the improved air and liquid shock cushioning cylinder 14, which is constructed and arranged as follows:

The cylinder 14 is about two inches in diameter by about four inches in length. Its rear end is closed by an integral head 15, while its opposite end is closed by a cap 16 having a threaded portion which is preferably screwed into the end of the cylinder, and is provided with a flange 17 of the same diameter as the cylinder, between which and the adjacent end of the cylinder is interposed a packing ring 18, which makes an air and liquid tight connection between the cap and cylinder.

The cap is formed with an axial packing box 19, which is surrounded by a hexagonal wrench-receiving lug or projection 20, by means of which the cap is screwed into or removed from the cylinder.

Upon the cylinder wall, and adjoining the ends of the cylinder are formed two vertically disposed, circular chambers 21 and 22, which are closed by caps 23 having threaded portions 24 which are screwed into the ends of the chambers, and flanged portions 25, between which and the ends of the chambers are interposed packing rings 26, and the caps are provided with wrench-receiving lugs 27. The cylinder wall adjacent its rear end is provided with a slot 28, which forms communication between the interior of the cylinder and the chamber 21; and a slot 29, of less width than the slot 28, is formed in the opposite end portion of the cylinder, which forms communication between the cylinder and the chamber 22, and the chambers 21 and 22 comprise air chambers, as will hereinafter appear.

The cylinder is provided with a piston 30, having a rod 31, which extends out through the packing box in the cap 16, and a suitable distance beyond the cap, and upon its outer end is screwed a block 32, having a bolt hole 33. This block 32 is inserted between and pivotally secured by a pin or bolt 34 to apertured ears 35 of a clip 36, which is secured to the spring 10 by bolts 37, and the lower ends of which are passed through a clip plate 38 which is clamped against the bottom leaf of the spring by nuts 39 on the end of the said bolts. The clip 36 is of sufficient width to prevent back and forth rocking movement of the same, after it has been bolted to the spring, and it is provided with depending lugs 40, which fit snugly against the edge of the leaf of the spring upon which the clip rests, thus preventing lateral movement of the clip.

A tubular support 41 fits slidably around the extended portion of the piston rod, and this support is formed on one end with a reduced projection 42 which forms a gland which enters the packing box 19, and the adjoining portion of the support is secured to the packing box by a coupler 43, which is threaded to the packing box 19 and to the end portion of the support 41. A cap 44 having an axial hole, is clamped upon the free end of the support by means of projections 45 formed in the rim of the cap, which are sprung into corresponding indentations 46 in the adjacent end portion of the support, and a packing washer 47 is interposed between the end of the cap and the end of the support.

A sleeve 48 surrounds the portion of the piston rod which extends beyond the support 41, and one end of this sleeve fits tightly upon and is secured by a pin 49 to a circular end portion of the block 32 on the end of the piston rod, the pin 49 also passing through the piston rod, as shown in Figure 1. The free end portion of the sleeve fits snugly but slidably over the adjacent end of the support, and when the piston is standing centrally of the length of the cylinder, the free end of the sleeve 48 terminates centrally between the capped end of the support and the adjacent end of the coupler 43, and as the support is slightly longer than the maximum distance traveled by the piston, the end of the sleeve will not engage the end of the coupler on the rearward stroke of the piston, neither will the end of the sleeve pass off of the outer end of the support on the forward stroke of the piston. The sleeve protects the piston rod from mud and water, and the packing washer 47 prevents dust and grit from working through the support 41 and into the cylinder. A hole 50 is formed in the under side of the sleeve 48 adjacent the block 32, and this hole prevents compression of air in the sleeve on the rearward stroke of the piston, or the forming of a vacuum therein on the forward stroke of the piston.

The cylinder 14 is filled with a suitable liquid, preferably oil, and the piston is provided with one or more holes X in horizontal line on each side of its axial center, which permits a portion of the oil in advance of the piston, on each stroke of the same, to pass through the said piston. An oil hole 51 is drilled in through the top of the block 32 to the bolt hole 33 in said block, and an oil hole 52 is drilled in through the top of the lug 13 on the end of the cylinder, to the bolt hole in said lug.

In practice, the improved shock absorbers are secured to the spring and to the spring supporting shackles in the manner shown and described, and while they are adapted to be employed in connection with the side springs and also with the rear spring, I have shown them connected with the front spring only; and the compression and rebound of the spring is transmitted to the shock absorbers in the following manner:

When the spring is compressed by a jolt due to the passing of the vehicle over a hump or a depression in the road, the length of the spring, or rather the distance between its two ends, is increased, and this lengthening of the spring rocks the shackles 7 on their pivot bolts 8, and the upper ends of the shackles are moved toward each other. The upper half of each shackle, from its pivot point, is preferably longer than the lower half; therefore the upper ends of the shackle travel in arcs of a greater radius than the arcs described by the lower ends of the shackle, and the cylinders are thus thrown inward or toward each other a greater distance from their normal positions, than the distance traveled by the ends of the springs outward from their normal positions, so that even a slight compression of the spring with a correspondingly short outward swing of the lower ends of the shackles, results in a much longer inward swing of their upper end to which the cylinders are attached. The compression of the spring also causes the clips 36 to move downward and outward, and the pistons 30 are thereby moved outward, through the connection of the piston rods with the said clips, simultaneously with the inward movement of the cylinders by the shackles, and the pistons are thus forced through the oil in the said cylinders, and towards their rear or pivoted ends. The movement of the pistons is gradually retarded by the oil, a part of which passes through the holes X in the said pistons, but the oil in advance of the piston is forced through the slots 28 in the cylinder walls and into the air chambers 21, thereby reducing the air space in the chambers and simultaneously compressing the air therein, and the compressing of the air in the air chambers 21 and the cooperation with the retarding action of the oil upon the pistons, gradually cushions and absorbs the shock due to the compression of the spring, the cushioning action being always in proportion to the force of the shock.

On the rebound of the spring, the rocking movement of the shackles is reversed, and the cylinders are thrown out or away from each other, and at the same time the pistons are drawn toward each other through the oil, a part of which passes through the holes in the pistons, while the oil ahead of the pistons is forced through the slots 29 in the cylinder walls, and into the air chambers 22, thereby reducing the air space in said chambers and simultaneously compressing the air therein, the same as on the opposite movement of the pistons, and with the same retarding action to said pistons. As the shock occasioned by the compression of the spring is greater than that occasioned by the rebound, the slot 28 is of greater area than the slot 29 to permit a quick passage of the oil from the cylinder into the air chamber 21.

The lengthening of the spring under compression is also made gradual, as it is controlled by the swinging movement of the shackles, which are in turn controlled by the retarding action of the cylinders.

The arrangement of the shock absorbers, shown in Figure 4, is also equally effective in counteracting the shock occasioned by side thrusts of the car body, the action of the cylinders and pistons being the same as under the compression and rebound of the spring, only that in the case of side or lateral thrusts of the car body, one of the pistons is pulled while the other is pushed, but the retarding action or resistance offered by the air and oil is the same.

The effectiveness of the improved shock absorber lies in the fact that the shock is instantly transmitted to the pistons, which are instantly cushioned by the retarding action of the oil, the retarding action being always in direct proportion to the force of the shock.

Having described my invention, what I claim as new and desire to secure by Letters Patent, is:

1. In a shock absorber, the combination with an axle, of shackles pivotally mounted thereon, intermediate of their ends, a body-supporting spring secured at its ends to the lower ends of said shackles and combined air and liquid cushioning mechanism connected to the upper ends of said shackles and to said spring.

2. In a shock absorber, the combination with an axle having brackets adjacent its ends, of shackles pivotally secured intermediate of their ends to said brackets, a body-supporting spring secured at its ends to the lower ends of said shackles, and liquid holding cylinders secured to the upper ends of said shackles having pistons provided with rods which are secured to said springs.

3. In a shock absorber of the character described, the combination with an axle having brackets adjacent its ends, of shackles pivotally secured intermediate of their ends to said brackets, a body-supporting spring secured at its ends to the lower ends of said shackles, liquid holding cylinders pivotally secured to the upper end of said shackles, apertured pistons in said cylinders having rods which are pivotally connected at their opposite ends to said spring, and air chambers on said cylinders which communicate with the interiors of the same.

4. In a shock absorber of the character described, the combination with an axle having brackets adjacent its ends, of shackles pivotally secured intermediate of their ends to said brackets, a body-supporting spring secured at its ends to the lower ends of said shackles, horizontally disposed liquid holding cylinders pivotally attached at one end to the upper ends of said shackles, air chambers on the opposite end portions of said cylinder walls, and slots in said cylinder walls affording communication between said air chambers and the interiors of the cylinders, apertured pistons in said cylinders normally positioned midway of their length, having rods, the free ends of which are secured to said spring, whereby the compression or rebound of the spring acts to rock the said shackles and reciprocate both the cylinders and their pistons.

5. A shock absorber, comprising a liquid holding cylinder, having air chambers on the opposite end portions of its wall, said wall having slots affording communication between the interior of said cylinder and said air chambers, a piston in said cylinder having apertures therein, and a rod which extends beyond one end of the cylinder, and a shackle which is pivotally attached at one end to said cylinder, said shackle having a bolt hole intermediate of its ends, and a bolt hole in its lower end.

6. In a shock absorber, the combination with an axle having brackets adjacent its ends, of shackles pivotally secured to said brackets intermediate of their ends, a body-supporting spring secured at its ends to the lower end of said shackles, horizontally disposed liquid holding cylinders pivotally secured at one end to the upper ends of said shackles, air chambers on the opposite end portions of said cylinders having removable caps, and slots in the cylinder walls opening into said air chambers, apertured pistons in said cylinders having rods, clips bolted to said spring, to which the free ends of said piston rods are pivotally secured, and means movable with the piston rods for shielding the same.

7. In a shock absorber of the character described, the combination with pivoted shackles, a spring secured at its ends to the lower end of said shackles, liquid and air holding cylinders attached to the upper ends of said shackles, having pistons and rods extending therefrom, and clips secured to said spring, to which the free ends of said piston rods are attached; of a tubular support surrounding a portion of the length of each rod and secured at one end to the adjacent end of the cylinder, and a sleeve slidably mounted at one end portion on said tubular support and secured at its opposite end to the outer end of said piston rod.

8. In a shock absorber of the character described, the combination with an axle, pivoted shackles thereon, a spring secured at its ends to the lower ends of said shackles, liquid and air holding cylinders attached to the upper ends of said shackles, having pistons and rods extending therefrom, and clips secured to said spring to which the outer ends of said rods are attached, said cylinders having movable caps on one end provided with packing boxes through which said rods pass; of tubular supports which surround said rods for a portion of their lengths, each support having a gland member, on one end of which enters the adjacent packing box, and a coupler connecting the end portion of the support having the gland, with the said packing box, an axially apertured cap on the opposite end of the support, a packing washer interposed between the cap and the end of the support, and a sleeve secured at one end to the outer end of the piston rod and slidably mounted on said support.

9. In a shock absorber, the combination with an axle, shackles pivotally supported thereon intermediate of their ends, and a body-supporting spring secured at its ends to the lower ends of said shackles; of a combined air and liquid cushioning mechanism comprising members moving one within the other, one of said members being secured to the upper end of each shackle, and the other member being secured to the spring.

In testimony whereof I affix my signature in presence of two witnesses.

FRANK N. SPRAGUE.

Witnesses:
G. SARGENT ELLIOTT,
ELIZABETH SMITH.